United States Patent
Iwasaki et al.

(10) Patent No.: US 8,732,393 B2
(45) Date of Patent: May 20, 2014

(54) APPARATUS, METHOD AND PROGRAM PRODUCT FOR DETERMINING THE DATA RECALL ORDER

(75) Inventors: Norie Iwasaki, Yamato (JP); Yutaka Oishi, Yamato (JP); Tomoko Taketomi, Yamato (JP); Kazuhiro Tsuruta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 13/120,642

(22) PCT Filed: Sep. 2, 2009

(86) PCT No.: PCT/JP2009/065344
§ 371 (c)(1),
(2), (4) Date: Mar. 23, 2011

(87) PCT Pub. No.: WO2010/035617
PCT Pub. Date: Apr. 1, 2010

(65) Prior Publication Data
US 2011/0179222 A1    Jul. 21, 2011

(30) Foreign Application Priority Data

Sep. 29, 2008  (JP) ................. 2008-251719

(51) Int. Cl.
*G06F 3/06*       (2006.01)
*G06F 13/10*     (2006.01)

(52) U.S. Cl.
CPC ............ *G06F 3/0611* (2013.01); *G06F 3/0659* (2013.01); *G06F 3/0686* (2013.01)
USPC ................ 711/111; 711/114; 711/E12.001

(58) Field of Classification Search
None
See application file for complete search history.

(56) References Cited

U.S. PATENT DOCUMENTS

| | | | |
|---|---|---|---|
| 5,418,971 A | 5/1995 | Carlson | |
| 6,763,427 B1 | 7/2004 | Doi et al. | |
| 7,757,052 B2 | 7/2010 | Bello et al. | |
| 2004/0243600 A1 | 12/2004 | Ikeda et al. | |
| 2006/0149898 A1 | 7/2006 | Bello et al. | |

FOREIGN PATENT DOCUMENTS

| | | | |
|---|---|---|---|
| CN | 1617100 A | 5/2005 | |
| CN | 101271438 A | 9/2008 | |
| EP | 0567238 A2 | 10/1993 | |
| JP | 06052025 A | 2/1994 | |
| JP | 2002007999 A | 1/2002 | |
| JP | 2004303190 A | 10/2004 | |
| JP | 2006512628 A | 4/2006 | |
| JP | 2006190274 A | 7/2006 | |
| JP | 2007241577 A | 9/2007 | |
| JP | 4407654 B2 | 2/2010 | |
| WO | 2010035617 A1 | 4/2010 | |

*Primary Examiner* — Kevin Verbrugge
(74) *Attorney, Agent, or Firm* — Griffiths & Seaton PLLC

(57) ABSTRACT

To provide a technique for optimizing the processing order of recall requests in which the average latency time of a host apparatus is minimized. A storage manager accepts a request of the host apparatus for the recalling data from a tape library, and stores the request in a queue table. In response to storage of the request, the storage manager calculates the latency time for each request in all the conceivable execution orders for all the requests stored in the queue table. The storage manager determines the execution order which minimizes the total calculated latency time for all the requests including the active request, and rearranges the requests in the queue table.

16 Claims, 12 Drawing Sheets

(a)

| Command ID | Reception time | Media ID | Start position | Execution time | End position | Starting time |
|---|---|---|---|---|---|---|
| Command #0 | Reception time $T_{R0}$ | Cartridge #1 | Start position $S_0$ | Execution time $C_0$ | End position $E_0$ | Starting time $T_{S0}$ |
| Command #1 | Reception time $T_{R1}$ | Cartridge #2 | Start position $S_1$ | Execution time $C_1$ | End position $E_1$ | — |
| ⋮ | ⋮ | ⋮ | ⋮ | ⋮ | ⋮ | ⋮ |

(b)

| Command ID | Reception time | Media ID | Start position | Execution time | End position | Starting time |
|---|---|---|---|---|---|---|
| Command #0-1 | Reception time $T_{R0}$ | Cartridge #1 | Start position $S_0$ | Execution time $C'_0$ | End position $E'_0$ | Starting time $T_{S0}$ |
| Command #0-2 | (Completion time of command #0-1) | Cartridge #1 | End position $E'_0$ | Execution time $C''_0$ | End position $E_0$ | — |
| Command #1 | Reception time $T_{R1}$ | Cartridge #2 | Start position $S_1$ | Execution time $C_1$ | End position $E_1$ | — |
| ⋮ | ⋮ | ⋮ | ⋮ | ⋮ | ⋮ | ⋮ |

| Execu-tion order | Command ID | Reception time | Starting time | Processing required time | Completion time | Latency time |
|---|---|---|---|---|---|---|
| 0 | Command #0 | Reception time $T_{R0}$ | Starting position $T_{S0}$ | Processing required time $A_0$ | Completion time $T_{E0}$ | Latency time $T_0$ |
| 1 | Command #1 | Reception time $T_{R1}$ | Completion time $T_{E0}$ | Processing required time $A_1$ | Completion time $T_{E1}$ | Latency time $T_1$ |
| ⋮ | ⋮ | ⋮ | ⋮ | ⋮ | ⋮ | ⋮ |

N!

(b)

| Execu-tion order | Command ID | Reception time | Starting time | Processing required time | Completion time | Latency time |
|---|---|---|---|---|---|---|
| 0 | Command #0-1 | Reception time $T_{R0}$ | Starting time $T_{S0}$ | Processing required time $A'_0$ | Completion time $T'_{E0}$ | Latency time $T'_0$ |
| 1 | Command #2 | Completion time $T_{R2}$ | Completion time $T'_{E0}$ | Processing required time $A_2$ | Completion time $T'_{E2}$ | Latency time $T_2$ |
| 2 | Command #0-2 | Completion time $T'_{E0}$ | Starting time $T'_{S0}$ | Processing required time $A''_0$ | Completion time $T''_{E0}$ | Latency time $T''_0$ |
| ⋮ | ⋮ | ⋮ | ⋮ | ⋮ | ⋮ | ⋮ |

# APPARATUS, METHOD AND PROGRAM PRODUCT FOR DETERMINING THE DATA RECALL ORDER

CROSS-REFERENCE TO RELATED APPLICATIONS

This application is a U.S. National-Stage entry under 35 U.S.C §371 based on International Application No. PCT/JP2009/065344, filed Sep. 2, 2009, which was published under PCT Article 21(2) and which claims priority to Japanese Patent Application No. 2008-251719 filed Sep. 29, 2008.

BACKGROUND OF THE INVENTION

1. Field of the Invention

The present invention relates to recalling a volume in a virtual tape server, and more particularly to a technique for optimizing the processing order of volume recall requests from the viewpoint of minimizing the average latency time of a host apparatus issuing the requests.

2. Description of the Related Art

A virtual tape storage system emulates a tape drive and a tape cartridge by using a hard disk drive. For example, the host apparatus performs the input/output (I/O) operation for a tape library by performing the I/O operation for one set of hard disk drives emulating the tape library. In the virtual tape storage system of the prior art, such as a Magstar virtual tape server of IBM® (International Business Machines (IBM® is a registered trademark of IBM Corporation of Armonk, N.Y.)), at least one virtual tape server (VTS) is connected to the tape library including a plurality of tape drives and the tape cartridge. The VTS is also connected to a DASD (Direct Access Storage Device) composed of a plurality of hard disk drives interconnected.

The DASD functions as a cache for the volume within the tape library. If receiving a request from the host apparatus, the VTS reads the requested volume from the cache and returns it to the host apparatus. If the requested volume does not exist in the cache, the VTS recalls the volume from the tape library to the cache. The cache can satisfy the I/O request more quickly than the tape library. However, since the capacity of cache is relatively smaller than that of tape library, only the volume to be accessed frequently is held in the cache. The VTS transfers the less frequently accessed volume from the cache to the tape library, using an algorithm such as LRU (Least Recently Used). The transferred volume is removed from the cache and abbreviated to a pointer pointing to the data on the tape cartridge, as one example.

In the typical VTS, the number of virtual devices providing access to the virtual volume is larger than the number of tape drives usable for recalling the volume. Therefore, more virtual devices than the tape drives may gain access to the virtual volume that does not exist in the cache. In such a case, a recall issued later is put into the queue for process limited. Generally, these recalls put into the queue are processed in first-in first-out order. A problem here is the time taken to recall.

For example, when the tape cartridge containing the recalled data is not mounted on any tape drive, one of the tape cartridges mounted at present must be unloaded from the tape drive. This process may possibly take one minute or more. Then, the tape cartridge containing the target data is loaded into the tape drive, and the tape is positioned at the top of data. This process also may possibly take one minute or more. Further, when all the tape drives are in use, it is required to wait until the process is ended in any tape drive. The time for waiting until the process is ended depends on the time required to perform the active process.

As the prior art for solving this problem and increasing the efficiency of recall request, there is Japanese Patent Application No. 2006-190274. Japanese Patent Application No. 2006-190274 discloses a technique for optimizing the queuing process by rearranging the queue in accordance with one or more optimization rules. As the optimization rules, Japanese Patent Application No. 2006-190274 discloses grouping the minimum number or maximum number of recall requests corresponding to the logical volume resident on a single mountable medium within the queue successively, or complying with the physical locations of at least two recall requests on the mountable medium in grouping. Japanese Patent Application No. 2006-190274 also discloses a technique for processing the first recall request based on a situation of the second recall request, or processing a specific recall request by ignoring the optimization rules if the minimum latency threshold value is reached, thereby preventing the requester from waiting for processing of any specific request too long.

With the technique as disclosed in Japanese Patent Application No. 2006-190274, the efficiency of recall request can be increased. However, this is the increased efficiency of recall request as seen from the VTS, but not from the host apparatus. The technique of Japanese Patent Application No. 2006-190274 makes the time for the VTS to use the tape drive as short as possible. However, the latency time of the host apparatus is the time since the VTS accepts the request of the host apparatus until the process is completed, and greatly depends on the time taken to process the request accepted previously by the VTS.

For example, if a request requiring a very long time to process is accepted previously by the VTS, a request issued immediately after it and put in the queue must wait for a long processing time of the previous request, though it can be intrinsically processed in a short time. As a result, the average latency time of the host apparatus is longer. In Japanese Patent Application No. 2006-190274, it is considered to assure the response time to the host apparatus by providing the minimum latency threshold value. However, with the technique as disclosed in Japanese Patent Application No. 2006-190274, the average latency time of the host apparatus is not shortened, though the requester is prevented from waiting for processing of any specific request too long. Actually, the actual processing time for each request is not considered in Japanese Patent Application No. 2006-190274.

SUMMARY OF THE INVENTION

Thus, the invention has been achieved to solve the above-mentioned problems, and it is an object of the invention to provide a device, method and program product for determining the data recall order in which the average latency time of the host apparatus can be minimized by considering the total of response time to the host apparatus for all the requests. Further, it is another object of the invention to provide a device, method and program product for determining the data recall order in which the average latency time of the host apparatus can be minimized by considering the total of response time to the host apparatus for all the requests, including the active request.

In order to accomplish the above object, the present invention involves obtaining the execution order in which the average latency time from acceptance of a request to completion of a process is minimum from among all the execution orders conceivable for all the requests put into a queue table, and rearranging the requests in the queue table in accordance with the obtained execution order. That is, the invention is realized by an apparatus, which is connected to a tape library, for determining the data recall order as follows. This apparatus comprises request acceptance means for accepting a request of a host apparatus for data required to recall from the tape library, storage means for storing the request in the queue table, first latency time prediction means for predicting latency time from acceptance of each request by the request acceptance means to completion of a process in the tape library in performing the process in each of all the execution orders conceivable for all the requests stored in the queue table in response to storage of the request in the queue table, first execution order determination means for determining a first execution order that is the execution order in which the total sum of the latency time predicted by the first latency time prediction means for all the requests including the active request is minimum as the execution order to be applied, and rearrangement means for rearranging the execution order of all the requests within the queue table in accordance with the determined execution order to be applied.

Preferably, the first execution order determination means determines, as the execution order to be applied, the first execution order that is the execution order in which the total sum of the latency time predicted by the first latency time prediction means for all the requests including the active request is minimum and the latency time for each request does not exceed the maximum allowable latency time. Herein, the maximum allowable latency time may be preset in the apparatus by the manager, or designated with the request from the host apparatus.

More preferably, the tape library includes a plurality of tape drives, each of which is provided with a queue table, first latency time prediction means and first execution order determination means. And the storage means virtually stores the one request in each of the plurality of queue tables. The above apparatus further comprises allocation target determination means for allocating the one request to the tape drive provided with the first execution order determination means that determines the minimum total sum of the latency time among the plurality of total sums of the latency time in the plurality of first execution orders determined by the plurality of first execution order determination means. The rearrangement means settles the storage of the one request in the queue table corresponding to the tape drive to which the request is allocated and rearranges the execution order of all the requests within the queue table in accordance with the first execution order determined by the first execution order determination means corresponding to the tape drive to which the request is allocated.

Also, in the invention, it is considered that the average latency time of the host apparatus may be shortened in some cases in view of the overhead by once interrupting the process for the currently active request and processing the later accepted request ahead.

That is, preferably, the above apparatus further comprises: second latency time prediction means for virtually dividing the active request into a first request for performing the process up to current time and a second request for performing the remaining process in response to storage of the request in the queue table, and predicting the latency time for each request in performing the process in each of all the execution orders conceivable for all the requests stored in the queue table including the second request; second execution order determination means for determining, as the second execution order, the execution order in which the total sum of the latency time predicted by the second latency time prediction means for all the requests including the first request is minimum; applied execution order determination means for redetermining, as the execution order to be applied, the second execution order if the total of the latency time in the second execution order is smaller than the total of the latency time in the first execution order, or otherwise the first execution order; and interruption means for interrupting the process for the active request in response to determination of the second execution order as the execution order to be applied.

More preferably, the first execution order determination means determines, as the execution order to be applied, the first execution order that is the execution order in which the total sum of the latency time predicted by the first latency time prediction means for all the requests including the active request is minimum and the latency time for each request does not exceed the maximum allowable latency time. And the second execution order determination means determines, as the second execution order, the execution order in which the total sum of the latency time predicted by the second latency time prediction means for all the requests including the first request is minimum and the latency time for each request does not exceed the maximum allowable latency time. Herein, the maximum allowable latency time may be preset in the device by the manager, or designated with the request from the host apparatus.

More preferably, the tape library includes a plurality of tape drives. In this case, each tape drive is provided with a queue table, first latency time prediction means, first execution order determination means, second latency time prediction means, second execution order determination means, interruption means and the applied execution order determination means. And the storage means virtually stores the one request in each of the plurality of queue tables. The above apparatus further comprises allocation target determination means for allocating the one request to the tape drive provided with an applied execution order determination means that determines the minimum total sum of the latency time among the plurality of total sums of the latency time in the plurality of execution orders to be applied determined by the plurality of applied execution order determination means. Each of the plurality of interruption means interrupts the process for the active request in response to determination of the corresponding second execution order as the execution order to be applied if the one request is allocated to the corresponding tape drive. The rearrangement means settles the storage of the one request in the queue table corresponding to the tape drive to which the request is allocated and rearranges the execution order of all the requests within the queue table in accordance with the execution order to be applied determined by the applied execution order determination means corresponding to the tape drive to which the request is allocated.

Though the invention has been described above as the apparatus for determining the data recall order, the invention may be grasped as a method or program product for determining the data recall order, which is performed in such apparatus.

BRIEF DESCRIPTION OF THE DRAWINGS

FIG. 4(a) is a view of a queue table according to first and third embodiments of the invention;

FIG. 4(b) is a view showing the queue table according to second and fourth embodiments of the invention;

FIG. 6(a) is a view showing a latency time calculation table, according to the first and third embodiments of the invention;

FIG. 6(b) is a view showing the latency time calculation table, according to the second and fourth embodiments of the invention;

DETAILED DESCRIPTION OF THE DRAWINGS

Figure 1:
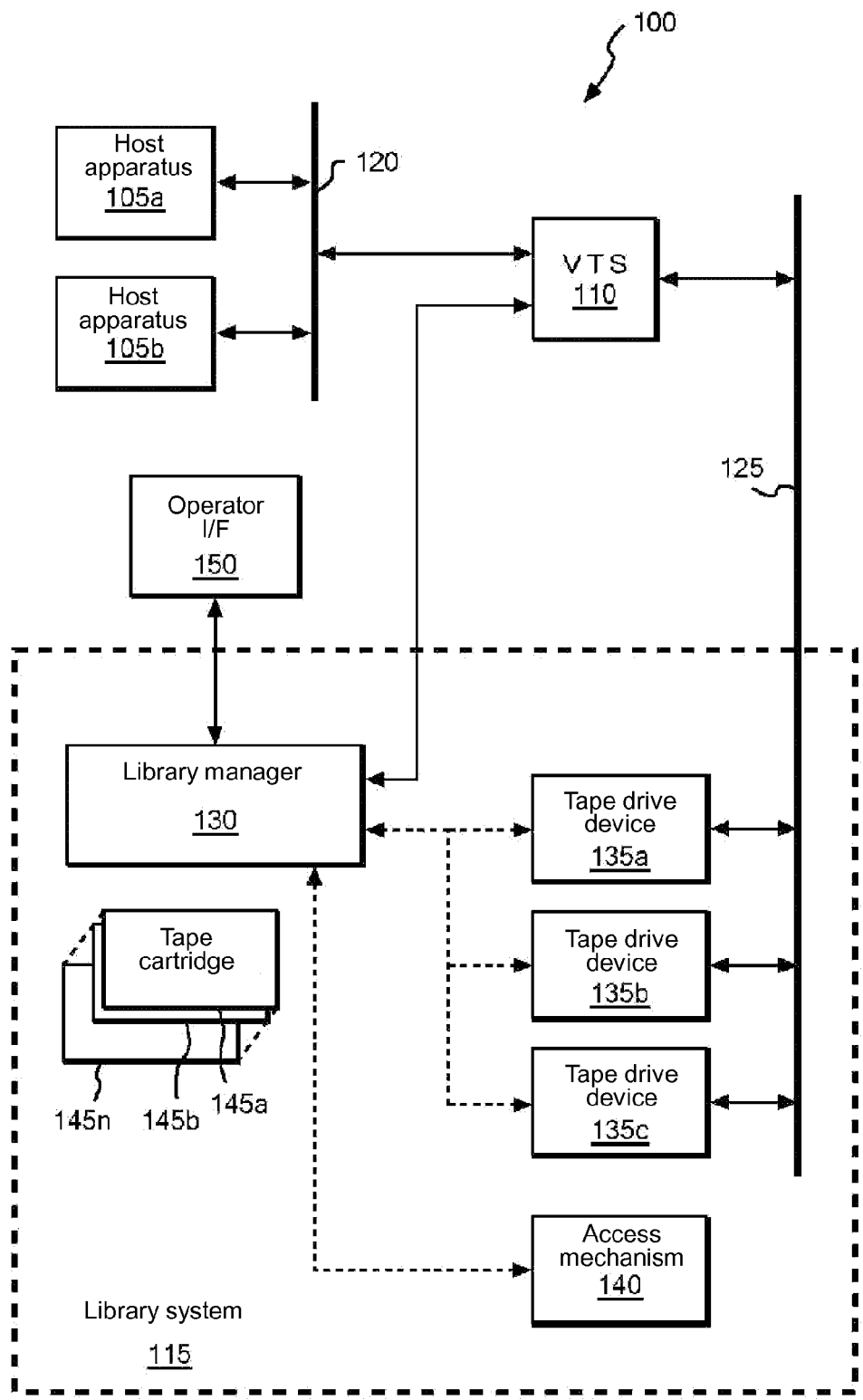
FIG. 1 is a diagram of the hardware configuration of a virtual tape system, according to an embodiment of the present invention.

With the invention, the requests put into the queue table are rearranged in the execution order in which the total of latency time for all the requests from acceptance of the request to completion of the process in the tape library is minimum As a result, with the device according to the invention, the average latency time of the host apparatus can be minimized, and the efficiency of recall request as seen from the host apparatus is increased. The other advantages of the invention will be understood from the description of each embodiment.

The present invention will be described below in detail with reference to the drawings, though the invention is not limited to the following embodiments as defined in the claims, and all the combinations of features as described in the embodiments may not be necessarily requisite for solving means of the invention. The same parts are designated by the same reference numerals throughout the entire description of the embodiments.

FIG. 1 shows a typical hardware configuration of a virtual tape system 100 usable in an embodiment of the invention. The virtual tape system 100 according to this embodiment comprises at least one host apparatus 105, at least one virtual tape server (Virtual Tape Server, VTS) 110, and a library system 115.

Each host apparatus 105a, 105b may be a computer well known in the relevant technical field such as a personal computer, a workstation, a server, and a main frame. Also, each host apparatus 105a, 105b may comprise an operating system well known in the relevant technical field. A connection 120 between the host apparatus 105 and the VTS 110 can be a storage area network (SAN), or other suitable communication channels, for example, an enterprise system connection (ES-COM®, which is a registered trademark of IBM Corporation) channel for use in an IBM® main frame computer.

The VTS 110 is a server computer well known in the relevant technical field, and comprises an operating system well known in the relevant technical field. For example, in a specific implementation of the invention, the VTS 110 is performed on one or more computers comprising an IBM RS/6000® system, the IBM P series® (both of IBM Corporation of Armonk, N.Y.), and may comprise an IBM AIX® (trademark of IBM Corporation) operating system.

The VTS 110 may also comprise applications such as a storage manager for optimizing the use of storage. The storage manager may be implemented as an independent application or some of other plural applications. In a specific implementation, the storage manager may comprise an IBM Magstar® (a registered trademark of IBM Corporation) virtual tape server and the software for using an automatic data storage library such as IBM ADSTAR ® (a registered trademark of IBM Corporation) distributed management (ADSM) software or Tivoli® (a registered trademark of IBM Corporation) storage manager. The storage manager can perform the data movement operation among the host apparatus 105, a cache within the VTS 110 as will be described later, and the library system 115.

The library system 115 may be a tape library such as Magstar® 3494 tape library, or another automatic data storage library system well known in the relevant technical field. In a specific implementation, the library system 115 comprises a library manager 130, one or more tape drive devices 135a, 135b and 135c for making up a tape drive unit, an access mechanism 140, and a plurality of tape cartridges 145a, . . . , 145n. The library manager 130 realized by a computer is interconnected with the tape drive device 135 and the access mechanism 140, and controls the operation of them.

Three tape drive devices 135a, 135b and 135c are shown in FIG. 1. The invention is operable under the virtual tape system 100 comprising one or more tape drive devices 135. In FIG. 1, the interconnection between the library manager 130, the tape drive device 135 and the access mechanism 140 is indicated by the broken line to show that the library manager 130 sends or receives a control signal to or from the tape drive device 135 or access mechanism 140, or both. On the other hand, the interconnection between the VTS 110 and the tape drive device 135 is indicated by the solid line to send or receive the stored or retrieved data.

The interconnection 125 between the VTS 110 and the tape drive device 135 can be made via the SAN, a local area network (LAN), a wide area network (WAN), or the internet. Or the VTS 110 and the tape drive device 135 may be connected by point-to-point or multi drop bus connection, or other networks of suitable type, including, for example, direct connection via a Small Computer Storage Interface (SCSI).

The access mechanism 140 may be a robot arm or any other mechanical device configured to transfer the selected tape cartridge 145 to the designated tape drive device 135. The access mechanism 140 usually comprises a gripper and a bar code scanner or an equivalent reading system mounted on the gripper. The bar code scanner is used to read the serial number of volume printed on a cartridge label pasted on the tape cartridge 145.

An operator interface 150 is connected to the library manager 130. The operator interface 150 is a computer that communicates with the library manager 130. The user can control an operating parameter of the library system 115 independently of the host apparatus 105.

The host apparatus 105 exchanges a tape operation with the VTS 110. The execution of the tape operation involves retrieving the data from a logical volume stored in the cache within the VTS 110 or storing the data in the logical volume. The VTS 110 automatically performs beforehand the migration (offload) of the logical volume within the cache. In a specific implementation, the logical volume of the LRU is transferred from the cache to the tape cartridge 145 within the library system 115. In the case where the host apparatus 105 needs the logical volume that does not exist within the cache, the storage manager of the VTS 110 instructs the library system 115, namely, the library manager 130, to mount the tape cartridge 145 containing the demanded logical volume on the appropriate tape drive device 135. The demanded data is recalled and copied as the logical volume within the cache of the VTS 110 from the tape cartridge 145.

Figure 2:
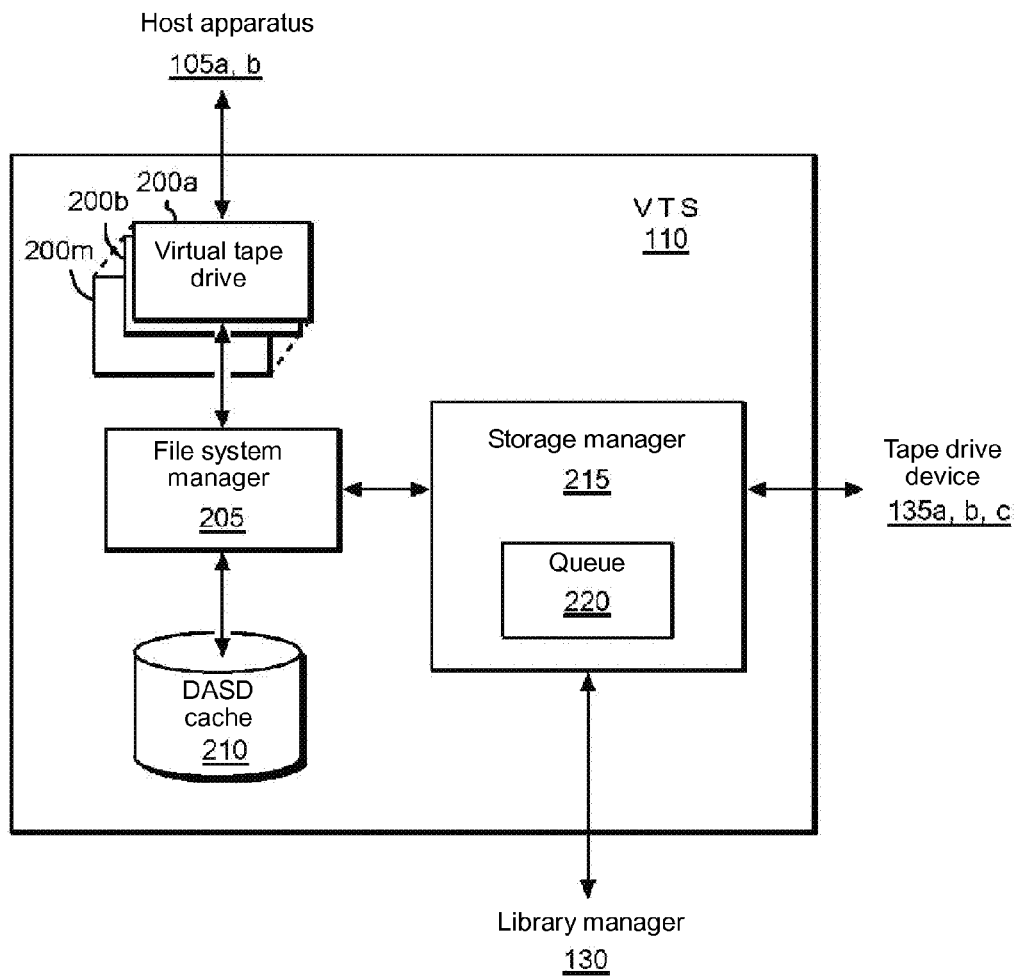
FIG. 2 is a diagram of a schematic block of a virtual tape server (VTS), according to an embodiment.

FIG. 2 is a schematic block diagram showing one embodiment of the VTS 110 as shown in FIG. 1. The VTS 110 can be realized by a computer having a bus, a processor, a memory and others. However, these components are omitted from FIG. 2 to clarify various executable modules and data blocks of the VTS 110 according to the invention. Also, other executable modules and data blocks known in the relevant field may exist in mounting of the VTS 110, but are omitted from FIG. 2 to focus on the components indispensable to the invention.

The VTS 110 comprises a plurality of virtual tape drives 200a, . . . , 200m, a file system manager 205, at least one DASD (Direct Access Storage Device) cache 210, a storage manager 215 and a queue 220, as shown in FIG. 2.

The DASD cache 210 temporarily stores the data from the host apparatus 105 in the file format on the logical volume. As one example, the DASD cache 210 is composed of one or more hard disk drives that can be arranged within a redundant array of independent drives such as a RAID5. A write command and the data from the host apparatus 105 is received by the virtual tape drive 200, processed, and written into the DASD cache 210 as a file. Thereafter, the storage manager 215 makes a request to the library manager 130 for copying the file to the tape cartridge 145 at an appropriate timing. Thereafter, the updated logical volume is transferred from the DASD cache 210 to the appropriate tape cartridge 145 mounted on the tape drive device 135 by the storage manager 215. The virtual tape drive 200 also processes a control command from the host apparatus 105.

The file system manager 205 manages and adjusts the data storage within the DASD cache 210. The storage manager 215 controls the communication between the file system manager 205 and the tape drive device 135. The storage manager 215 also controls the communication between the VTS 110 and the library manager 130. If the host apparatus 105 makes a request for the specific logical volume, the storage manager 215 receiving the request via the virtual tape drive 200 judges whether or not the demanded logical volume is within the DASD cache 210.

If it is not within the DASD cache 210, the storage manager 215 makes a request to the library manager 130 for recalling the demanded logical volume. Thereafter, the demanded logical volume returned from the tape drive device 135 to the VTS 110 is copied to the DASD cache 210 and returned via the virtual tape drive 200 to the host apparatus 105. The storage manager 215 can comprise the queue 220 for temporarily putting in an additional recall request. Accordingly, the storage manager 215 is the device for recalling the logical volume from the tape cartridge 145, using the tape drive device 135.

The library manager 130 as shown in FIG. 1 has a database (not shown) for storing information regarding the logical volume and the physical volume. Receiving an instruction from the VTS 110, the library manager 130 finds the tape cartridge 145 from which the copy of the logical volume is created or retrieved by referring to the database, and sends an instruction for mounting the tape cartridge 145 to the appropriate tape drive device 135 or the access mechanism 140, or both.

(First Embodiment)

Figure 3:
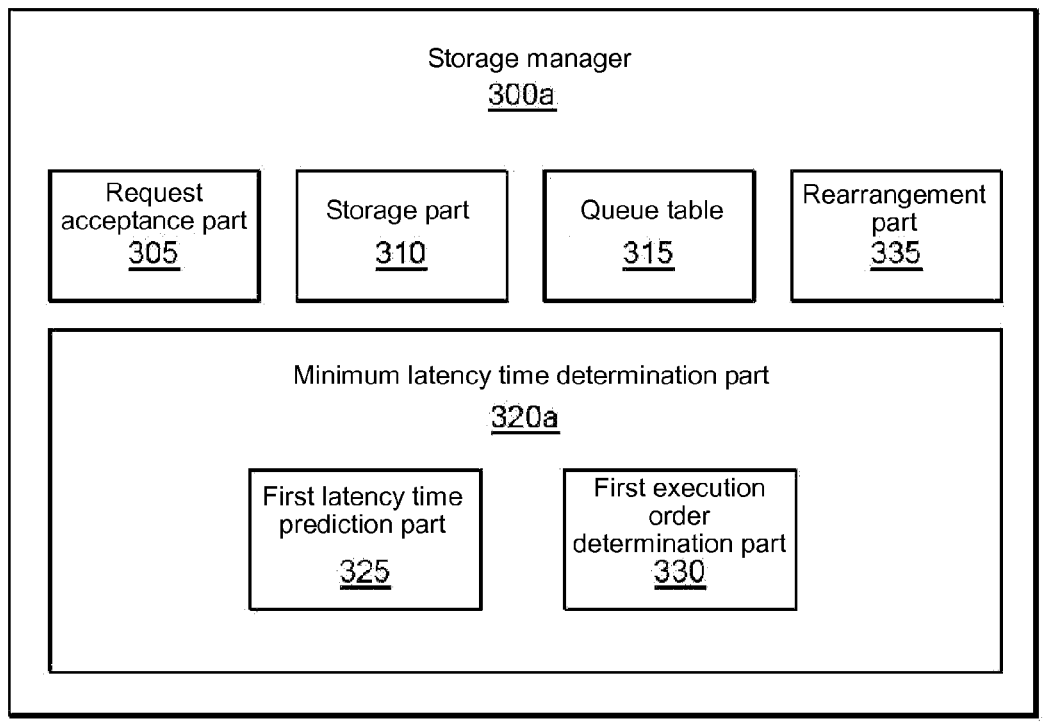
FIG. 3 is a diagram of the functional configuration of a storage manager as an apparatus for determining the data recall order, according to an embodiment of the invention.

FIG. 3 is a diagram showing one example of the functional configuration of a storage manager 300a as an apparatus for determining the data recall order according to a first embodiment of the invention. In the first embodiment, the library system 115 as shown in FIG. 1 comprises only one tape drive device 135. The storage manager 300a according to the first embodiment obtains the execution order in which the average latency time from acceptance of a request to completion of the process in the library system 115 is minimum among all the execution orders conceivable for all the requests put into the queue table and rearranges the requests within the queue table in accordance with the obtained execution order.

The storage manager 300a according to the first embodiment comprises a request acceptance part 305, a storage part 310, a queue table 315, a minimum latency time determination part 320, and a rearrangement part 335. Herein, the minimum latency time determination part 320 comprises a first latency time prediction part 325 and a first execution order determination part 330.

The request acceptance part 305 accepts a request X of the host apparatus 105 for the data required to recall from the library system 115. At this time, the request acceptance part 305 acquires the current time as the reception time of the request X. The request acceptance part 305 also allocates a command ID for uniquely identifying the request X to the accepted request. The request X of the host apparatus 105 accepted by the request acceptance part 305 is either a data read or write request, but the data read request will be described below in this embodiment.

The data read request from the host apparatus 105 includes information for identifying the target data. Thus, the request acceptance part 305 determines the media ID where the target data is recorded, or the identifier of the tape cartridge, a read start position on the tape cartridge, an execution time taken to read the target data, and a read end position on the tape cartridge from the identification information of the target data. Herein, the execution time means the time required to move the tape from the read start position to the read end position. In obtaining the execution time, for example, a reading tape speed (e.g., 8.5 m/sec) set by default can be used. The request acceptance part 305 passes various kinds of information on the accepted request to the storage part 310.

The storage part 310 stores the request X accepted by the request acceptance part 305 in the queue table 315. FIG. 4(a) shows one example of the queue table 315 according to the invention. The queue table 315 according to this embodiment includes a command ID field, a reception time field, a media ID field, a start position field, an execution time field, and an end position field, as shown in FIG. 4(a). The storage part 310 stores various kinds of information passed from the request acceptance part 305 in the corresponding fields of the queue table 315. The request X is deleted from the queue table 315, when taken out of the queue table 315 for processing. However, various kinds of information on the taken out request X are stored in the memory together with the processing starting time until the processing for the request X is completed. To facilitate the understanding, the queue table 315 having a starting time field including an entry of request (command #0) being processed is shown in FIG. 4(a).

The first latency time prediction part 325 predicts the latency time for each request in performing the process in each of all the execution orders conceivable for all the requests stored within the queue table 315 in response to storage of the request X in the queue table 315. Herein, the latency time means the time from acceptance of the request X by the request acceptance part 305 to completion of the process of the request X in the library system 115. The latency time Tx for the request X can be represented in accordance with the following formula.

a. $Tx = Wx(o) + Ax(p,n)$ (1)

In the formula (1), Wx(o) denotes the latency time before start from acceptance of the request X by the request acceptance part 305 to start of the process for the request X. Wx(o) is a function dependent on the processing order of all the requests stored in the queue table 315. Also, Ax(p,n) denotes the processing required time from the start of the process for the request X to the end of the process. Ax(p,n) is a function dependent on the requests processed immediately before and after the concerned request. Ax(p,n) denoting the processing required time can be also represented in the following formula.

a. $Ax(p,n) = Lx(p) + Sx(p) + Cx + Rx(n) + Ux(n)$ (2)

Lx(p) denotes the load time required to load the media, namely, the tape cartridge 145, for recording the data subject to the request X into the tape drive device 135. It is considered that the load time strictly depends on the physical positional relationship between the storage location of the tape cartridge 145 and the tape drive device 135. However, there is no difference under the library system 115 in which the access mechanism 140 moves the next used tape cartridge 145 directly to the side of the tape drive device 135 while the tape drive device 135 unloads the tape cartridge 145. In this embodiment, Lx(p) is the predetermined load time, for example, 10 seconds. However, if the data subject to the request X is recorded in the same tape cartridge 145 as the previously processed request, Lx(p) becomes 0, because it is unnecessary that the tape cartridge 145 is loaded. In the above way, Lx(p) is a function dependent on the previously processed request.

Sx(p) denotes the alignment time required to move the tape to the read start position of the data subject to the request X. Sx(p) is obtained by dividing the length of tape from the top of tape to the read start position of the data subject to the request X by the moving speed of the tape. The moving speed of the tape may be the default moving speed (e.g., 10 m/sec) of the tape. However, if the data subject to the request X is recorded in the same tape cartridge 145 as the previously processed request, the function Sx(p) is obtained by dividing the length of tape from the read end position of data for the previous request to the read start position of data subject to the request X by the moving speed of the tape. In the above way, Sx(p) is the function dependent on the previously processed request.

Cx denotes the execution time actually taken to read the target data as described above. Rx(n) denotes the rewind time required to rewind the tape to the top after the end of reading the target data. Rx(n) is obtained by dividing the length of tape from the read end position of the data subject to the request X to the top of tape by the moving speed of the tape. The moving speed of the tape may be the default moving speed (e.g., 10 m/sec) of the tape as mentioned above. However, if the data subject to the request X is recorded in the same tape cartridge 145 as the next processed request, Rx(n) becomes 0, because it is unnecessary to rewind the tape. In the above way, Rx(p) is a function dependent on the next processed request.

Lastly, Ux(n) denotes the unload time required to unload the tape cartridge 145 that ends reading the data from the tape drive device 135. Since the tape drive device 135 can perform the following process after unloading the tape cartridge 145, the unload time in this embodiment does not include the time required to move the tape cartridge 145 from the tape drive device 135 back to the original storage position. In this embodiment, Ux(p) is a predetermined unload time, for example, 20 seconds. However, if the data subject to the request X is recorded in the same tape cartridge 145 as the next processed request, Ux(p) becomes 0 because it is unnecessary to unload the tape cartridge 145. In the above way, Ux(p) is a function dependent on the next processed request.

Figure 5:
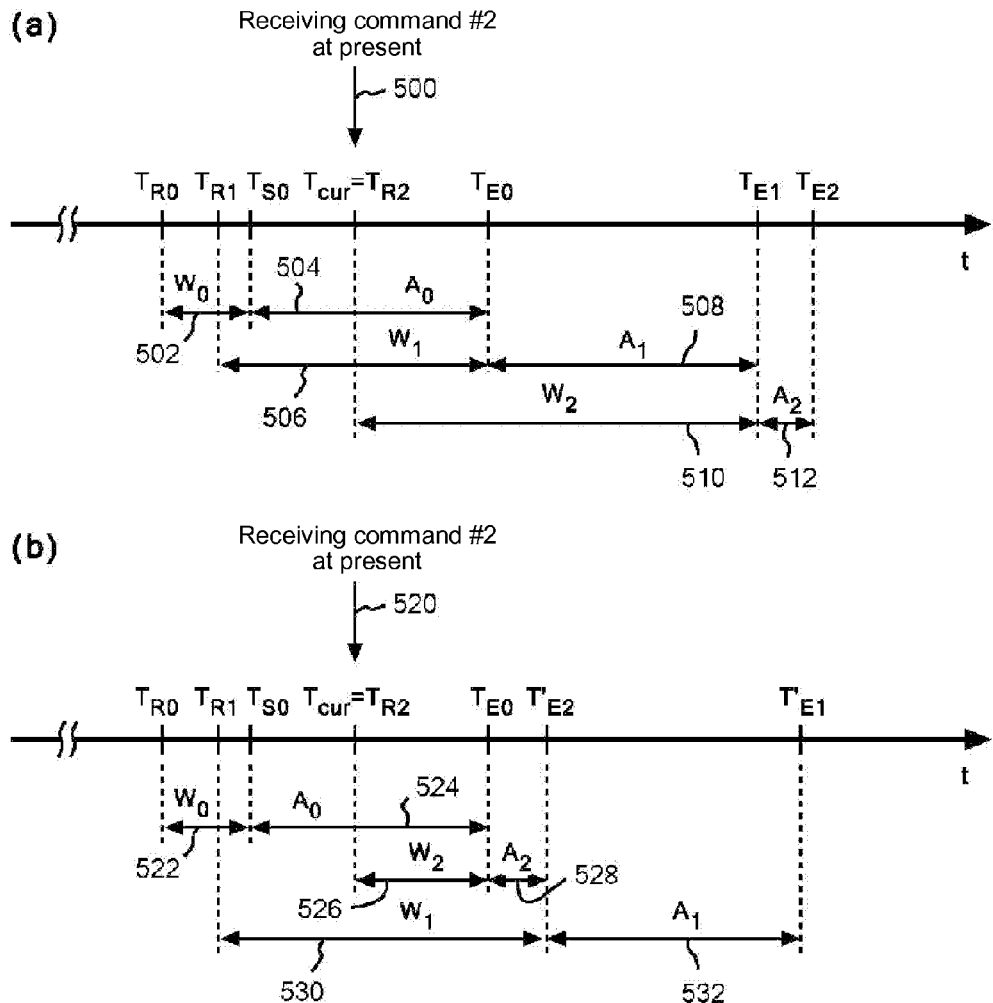
FIG. 5(a) is a diagram showing the latency time for each request in processing the request in accepting order.
FIG. 5(b) is a diagram showing the latency time for each request in the first and third embodiments of the invention.

Herein, referring to FIGS. 5(a) and 5(b), how Wx(o) depends on the processing order of all the requests stored in the queue table 315 will be described below. In FIGS. 5(a) and 5(b), it is supposed that a recall request for the request (command #0) is processed at the current time $T_{cur}$, in which the request (command #1) and the request (command #2) just accepted at the time $T_{cur}$ are stored in the queue table 315. And it is supposed that the execution time C1 of the request (command #1) is very long, while the execution time C2 of the request (command #2) is very short.

In FIGS. 5(a) and 5(b), the times $T_{R0}$, $T_{R1}$ and $T_{R2}$ denote the acceptance time for the requests (command #0) to (command #2) at the request acceptance part 305. Also, the time $T_{S0}$ is the processing starting time of the request (command #0), and the times $T_{E0}$, $T_{E1}/T'_{E1}$ and $T_{E2}/T'_{E2}$ denote the processing end time of the requests (command #0) to (command #2), respectively. To facilitate the understanding, it is supposed that the target data for the requests (command #0) to (command #2) are recorded in the same tape cartridge 145.

FIG. 5(a) shows the pre-start latency time W and the processing required time A for each request in processing the requests in order in which the acceptance time at the request acceptance part 305 is earlier in this situation. As seen from FIG. 5(a), since the processing required time $A_1$ 508 of the request (command #1) is very long due to the execution time C1, the pre-start latency time $W_2$ 510 of the request (command #2) is long, though the processing required time $A_2$ 512 is very short.

On the other hand, FIG. 5(b) shows the pre-start latency time W and the processing required time A of each request in processing ahead the request (command #2) accepted after the request (command #1). In this case, since the request (command #2) does not need to wait for the processing of the request (command #1) having a long execution time C1, the pre-start latency time $W_2$ 526 is much shorter than the pre-start latency time $W_2$ 510 of the request 2 in FIG. 5(a). On the other hand, though the pre-start latency time $W_1$ 530 of the request (command #1) is longer than the pre-start latency time $W_1$ 506 of the request (command #1), the request (command #2) processed ahead, there is a slight difference, because the execution time C2 of the request (command #2) processed ahead is very short. Consequently, the average latency time of the requests (command #0) to (command #2) is smaller in FIG. 5(b) than in FIG. 5(a). In this way, the pre-start latency time Wx(o) of the request X depends on the processing order of all the requests stored in the queue table 315.

The first latency time prediction part 325 predicts the latency time for each request in performing the process in each of all the execution orders conceivable for all the requests stored in the queue table 315, using the above formulas (1) and (2). As one example, the first latency time prediction part 325 calculates the latency time for each request in the following way. For the sake of explanation, it is assumed that the recall for the request (command #0) is being processed at present, and N requests from the request (command #1) to the request (command #N) are stored in the queue table 315. Then, the N! execution orders conceivable for all the requests exist. Thus, a latency time calculation table as shown in FIG. 6(a) is created successively for the N! execution orders.

Each of a plurality of latency time calculation tables as shown in FIG. 6(a) has a command ID field, a reception time field, a starting time field, a processing required time field, a completion time field and a latency time field. Herein, a method for creating the latency time calculation table in one execution order D will be described below. To complete the latency time calculation table in the execution order D, first of all, the command ID and the reception time of each request are registered in the latency time calculation table successively in accordance with the execution order D. Herein, the requests to be registered include the request (command #0) being processed at present. However, for the latency time calculation table in any execution order, the request (command #0) is registered as the execution order 0 at the top of the latency time calculation table.

Next, the processing required time of each request is calculated in accordance with the execution order D, using the above formula (2), and the calculated processing required time is registered in the latency time calculation table. It should be noted that the processing required time Ax(p,n) for any request X can be obtained in accordance with the formula (2), using the values within the queue table 315, if the requests executed before and after it are determined. However, the media ID and the read end position of the request processed immediately before the request (command #0) are always held temporarily in the memory, and referred to in obtaining the processing required time Ax(p,n) of the request (command #0).

Next, the starting time $T_{S0}$ of the request (command #0) is read from the queue table 315 and registered in the latency time calculation table. Also, the completion time $T_{E0}$ of the request 0 is obtained by adding the processing required time $A_0$ of the request (command #0) to the starting time $T_{S0}$ of the request 0. Finally, the latency time for the request (command #0) is obtained by subtracting the reception time $T_{R0}$ from the completion time $T_{E0}$.

For the other requests, the same process as for the request (command #0) is performed successively in accordance with the execution order D. However, the starting time of the other requests is the completion time of the previous request immediately before the concerned request. And if the latency time calculation table creation process is performed in each of the N! execution orders, the latency time for each request is finally obtained in performing the process in each of all the execution orders.

The first execution order determination part 330 determines, as the execution order to be applied, the first execution order that is the execution order in which the total sum of the latency time predicted by the first latency time prediction part 325 for all the requests including the active request is minimum The first execution order determination part 330 calculates the total of the latency time from the request 0 to request N for each of the N! latency time calculation tables created by the first latency time prediction part 325. And the first execution order determination part 330 determines the first execution order that is the execution order corresponding to the latency time calculation table in which the total of the latency time is minimum as the execution order to be actually applied.

Preferably, the first execution order determination part 330 determines, as the execution order to be applied, the first execution order that is the execution order in which the total sum of the latency time predicted by the first latency time prediction part 325 for all the requests including the active request is minimum, and the latency time for each request does not exceed the maximum allowable latency time. Herein, the maximum allowable latency time may be preset in the device by the manager, or designated with the request from the host apparatus 105.

In this case, the first execution order determination part 330 extracts the latency time calculation table in which each latency time from the request (command #0) to the request (command #N) does not exceed the maximum allowable latency time from the N! tables created by the first latency time prediction part 325. And the first execution order determination part 330 calculates the total of the latency time from the request (command #0) to the request (command #N) for each of the extracted latency time calculation tables. Lastly, the first execution order determination part 330 determines the first execution order that is the execution order corresponding to the latency time calculation table in which the total of latency time is minimum as the execution order to be actually applied.

The rearrangement part 335 rearranges the execution order of all the requests within the queue table 315 in accordance with the execution order to be applied that is determined by the first execution order determination part 330.

In this way, in the storage manager 300a according to the first embodiment, each request put into the queue table 315 is rearranged in the execution order in which the total of the latency time for all the requests from acceptance of the request to completion of the process is minimum As a result, with the device according to the invention, the average latency time of the host apparatus 105 can be minimized, whereby the efficiency of the recall request is enhanced as seen from the host apparatus.

(Second Embodiment)

Figure 7:
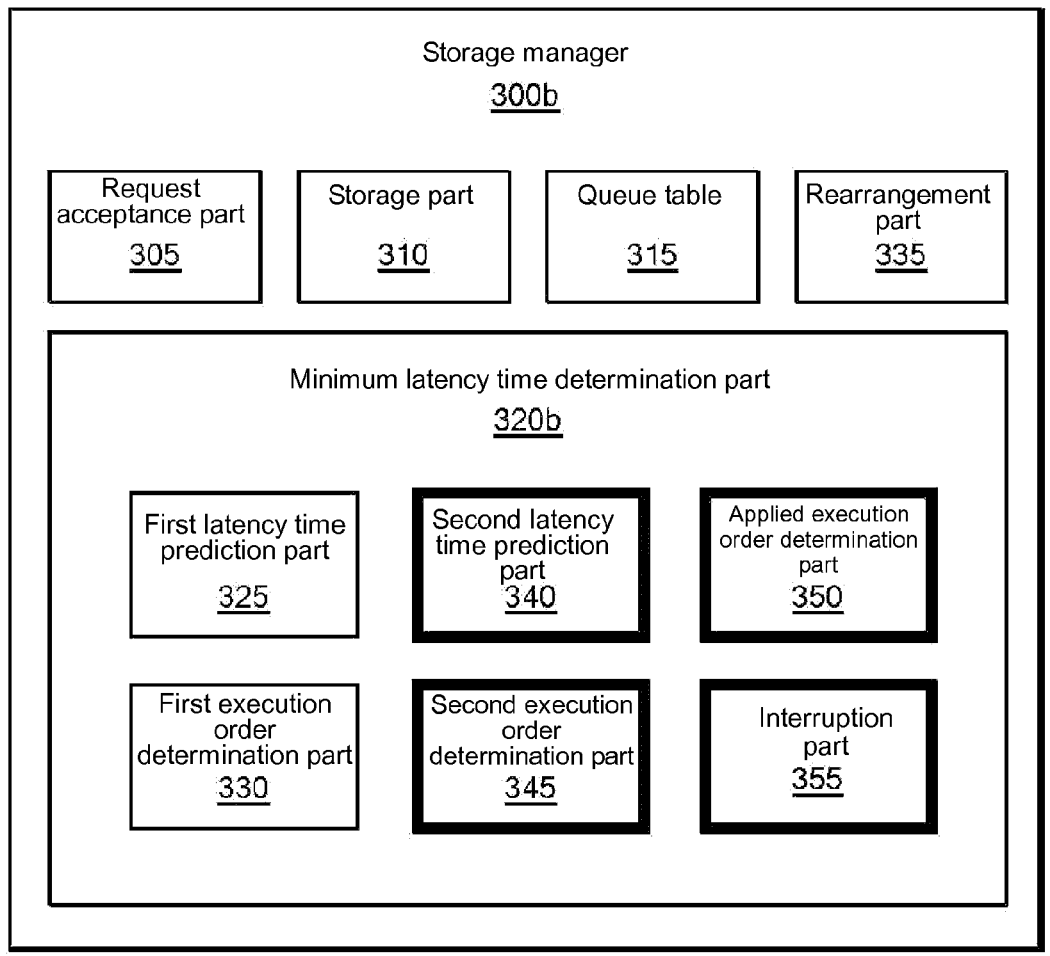
FIG. 7 is a diagram showing the functional configuration of a storage manager as an apparatus for determining the data recall order according to a second embodiment of the invention.

FIG. 7 is a diagram showing one example of the functional configuration of a storage manager 300b as an apparatus for determining the data recall order according to a second embodiment of the invention. In the second embodiment, the library system 115 as shown in FIG. 1 comprises only one tape drive device 135. The storage manager 300b according to the second embodiment takes into consideration that the average latency time of the host apparatus 105 may be shortened in some cases in view of the overhead by once interrupting the process for the currently active request and processing the later accepted request ahead.

Figure 8:
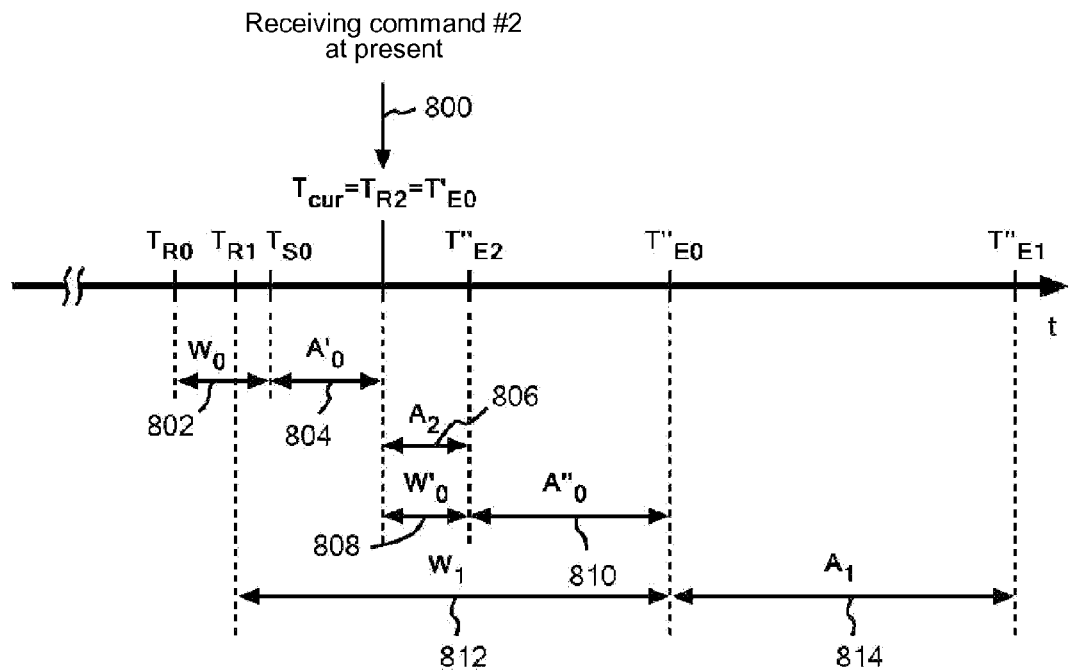
FIG. 8 is a diagram showing the latency time for each request in processing the succeeding request ahead by interrupting the active request.

Referring to FIGS. 5(a) and 8, an instance where the average latency time of the host apparatus 105 can be shortened by once interrupting the process for the currently active request in this way will be described below. In FIGS. 5(a) and 8, it is supposed that the recall request for the request (command #0) at the current time $T_{cur}$ is processed, in which the request (command #1) and the request (command #2) just accepted at the time $T_{cur}$ are stored in the queue table 315. And it is supposed that the execution time $C_0$ of the request (command #0) and the execution time $C_1$ of the request (command #1) are very long, while the execution time $C_2$ of the request (command #2) is very short.

In FIGS. 5(a) and 8, the times $T_{R0}$, $T_{R1}$ and $T_{R2}$ denote the acceptance time at the request acceptance part 305 for the requests (command #0) to (command #2. Also, the time $T_{S0}$ is the processing starting time of the request (command #0). In FIG. 5(a), the times $T_{E0}$, $T_{E1}$ and $T_{E2}$ denote the processing end time of the requests (command #0) to (command #2)), respectively. Also, in FIG. 8, the times $T'_{E0}$ denotes the time of interrupting the request (command #0) (the current time $T_{cur}$ and the acceptance time of the request (command #2) at the same time), and the times $T''_{E0}$, $T''_{E1}$ and $T''_{E2}$ denote the processing end time of the resumed request (command #0), the request (command #1) and the request (command #2). To facilitate the understanding, it is supposed that the target data of the requests (command #0) to (command #2) are recorded in the same tape cartridge 145.

FIG. 5(a) shows the pre-start latency time W and the processing required time A of each request in processing the request in order in which the acceptance time at the request acceptance part 305 is earlier in this situation. As seen from FIG. 5(a), since the processing required time $A_0$ 504 of the request (command #0) and the processing required time $A_1$ 508 of the request (command #1) are very long due to the execution times $C_0$ and $C_1$, respectively, the pre-start latency time $W_2$ 510 of the request (command #2) is long, though the processing required time $A_2$ 512 is very short.

On the other hand, FIG. 8 shows the pre-start latency time W and the processing required time A of each request in performing the process by once interrupting the recall process for the request (command #0) at the current time $T_{cur}$ when the request (command #2) is accepted and processing the request (command #2) ahead. In this case, since the request (command #2) does not need to wait for the processing of the requests 0 and 1 having long execution times $C_0$ and $C_1$, respectively, the pre-start latency time becomes 0. If the request (command #0) and the request (command #2) are intended for the data recorded in the different tape cartridges 145, the request (command #2) needs to wait for the rewind time $R_1(n)$ and the unload time $U_1(n)$ for the request (command #0).

On the other hand, since the request (command #0) waits for the resumption of the process, the latency time of the pre-start latency time $W'_0$ 808 newly occurs. Also, since the request (command #1) needs to wait for the processing of the request (command #2), the pre-start latency time $W_1$ 812 is longer than the pre-start latency time $W_1$ 506 of FIG. 5(a). But since the execution time $C_2$ of the request (command #2) is very short, the influence is very slight. Consequently, the average latency time of the requests (command #0) to (command #2) is shorter in FIG. 8 than in FIG. 5(a). The latency time of the request (command #0) is the total of $W_0$ 802, $A'_0$ 804, $W'_0$ 808 and $A''_0$ 810. In this way, the average latency time of the host apparatus 105 may be shortened in some cases by once interrupting the processing for the currently active request. The data read for the request (command #0) before interruption may be temporarily held. And in resuming the request (command #0), only the remaining data may be read.

In this way, the storage manager 300b according to the second embodiment considering the interruption of the currently active request has partly the same functional configuration as the storage manager 300 according to the first embodiment. But the minimum latency time determination part 320 according to the second embodiment further comprises a second latency time prediction part 340 and a second execution order determination part 345 for obtaining the minimum average latency time on the assumption that the processing for the currently active request is once interrupted. Also, the minimum latency time determination part 320 according to the second embodiment further comprises an applied execution order determination part 350 and an interruption part 355 for comparing the minimum average latency time on the assumption that the processing for the currently active request is not interrupted and the minimum average latency time on the assumption that the processing for the currently active request is interrupted, and interrupting the process for the currently active request if the average latency time is smaller by interruption.

Thus, the plurality of newly added components will be described below. The process of the second latency time prediction part 340 and the second execution order determination part 345 is independent of the process of the first latency time prediction part 325 and the first execution order determination part 330, and accordingly these processes may be performed at the same time, or in succession.

The second latency time prediction part 340 virtually divides the active request into a first request for performing the process to current time and a second request for performing the remaining process in response to storage of the request X in the queue table 315, and predicts the latency time for each request in performing the process in each of all the execution orders conceivable for all the requests stored in the queue table 315 including the second request. A specific method for the process of the second latency time prediction part 340 will be described below.

First of all, the second latency time prediction part 340 creates the copy of the queue table 315 in response to storage of the request X in the queue table 315. However, the entries of the first request and the second request are added to the copy of the queue table 315. For example, it is assumed that when the request X is accepted by the request acceptance part 305, the request (command #0) is being processed, and there is the queue table 315 as shown in FIG. 4(a). To facilitate the explanation, the queue table 315 of FIG. 4(a) has the entry of the request (command #0) left and is provided with the starting time field, as described in the first embodiment. Actually, these data are held in the memory, apart from the queue table 315. Then, the second latency time prediction part 340 creates a new queue table as shown in FIG. 4(b), based on the queue table 315 as shown in FIG. 4(a).

The command ID of the request being processed currently is the command #0 in FIG. 4(a). Also, the command IDs of the first request and the second request into which the request being processed currently is divided are the command #0-1 and the command #0-2 in FIG. 4(b). The corresponding values of the entry of the original request being processed currently, namely, the command #0, are directly copied to the media ID field and the end position field of the second request, and the reception time field, the media ID field, the start position field and the starting time field of the first request (see FIGS. 4(a) and 4(b)). The current position E'o of the head for the tape drive device 135 at the time when the request X is put into the queue table 315 is registered in the remaining field of the first request, namely, the end position field of the first request. The value C'o of dividing the distance from the start position So to the end position E'o by the reading tape speed (e.g., 8.5 m/sec) is registered in the execution time field of the first request.

On the other hand, the value of the end position E'o of the first request is registered in the start position field of the second request. Also, the original request being processed currently, namely, the value C"o of subtracting the execution time C"o of the first request from the execution time Co of the command #0 is registered in the execution time field of the second request. The reception time field of the second request is left blank. This is due to the following reason. The reception time of the second request is the completion time of processing the first request. But the processing of the first request is not ended at the same time with the determination of interrupting the request (command #0) being processed currently, but ended at the time when the rewind of the tape for the first request and the unload of the tape cartridge are ended. And the rewind time R and the unload time U depend on the immediately succeeding request as described above. Therefore, if the request to be processed next to the first request is not determined, the completion time of processing the first request can not be calculated.

If the copy of the queue table 315 is created, the second latency time prediction part 340 creates the latency time calculation table as described in the first embodiment basically in the same way as described in the first embodiment. FIG. 6(b) shows such latency time calculation table. The second latency time prediction part 340 virtually divides the request (command #0) being processed into the first request being active and the second request waiting for processing. Therefore, the number of requests waiting for processing within the queue table 315 is equivalently increased by one, and the second latency time prediction part 340 creates the latency time calculation table using the copy of the created queue table 315, not the queue table 315. Also, the number of execution orders conceivable for all the requests is (N+1)!, whereby the (N+1)! latency time calculation tables are created.

It should be noted that after the completion time of processing the first request is calculated, the completion time is registered in the reception time field of the second request in any latency time calculation table. The latency time for each request in performing the process in each of the execution orders conceivable for all the requests stored in the queue table 315 including the second request is obtained at the same time when the (N+1)! latency time calculation tables are created by the second latency time prediction part 340.

The second execution order determination part 345 determines, as the second execution order, the execution order in which the total sum of the latency time predicted by the second latency time prediction part 340 for all the requests including the first request is minimum The second execution order determination part 345 calculates the total of the latency time for the first request (command #0-1), the second request (command #0-2) and the request (command #1) to request (command #N) in each of the (N+1)! latency time calculation tables created by the second latency time prediction part 340. And the second execution order determination part 345 determines as the second execution order the execution order corresponding to the latency time calculation table in which the total of the latency time is minimum.

Preferably, the second execution order determination part 345 determines, as the second execution order, the execution order in which the total sum of the latency time predicted by the second latency time prediction part 340 for all the requests including the first request is minimum, and the latency time for each request does not exceed the maximum allowable latency time. Herein, the maximum allowable latency time may be preset in the device by the manager, or designated with the request from the host apparatus 105.

In this case, the second execution order determination part 345 extracts the latency time calculation table in which each latency time for the first request (command #0-1), the second request (command #0-2) and the request (command #1) to request (command #N) does not exceed the maximum allowable latency time from the (N+1)! latency time calculation tables created by the second latency time prediction part 340. And the second execution order determination part 345 calculates the total of the latency time for the first request (command #0-1), the second request (command #0-2) and the request (command #1) to request (command #N) in the extracted latency time calculation table. Lastly, the second execution order determination part 345 determines, as the second execution order, the execution order corresponding to the latency time calculation table in which the total of latency time is minimum.

The applied execution order determination part 350 redetermines, as the execution order to be applied, the second execution order if the total of the latency time in the second execution order determined by the second execution order determination part 345 is smaller than the total of the latency time in the first execution order determined by the first execution order determination part 330, or otherwise the first execution order. If the second execution order is determined as the execution order to be applied, the applied execution order determination part 350 notifies the rearrangement part 335 to add an entry of the second request to the queue table 315.

The rearrangement part 335 rearranges the execution order of all the requests within the queue table 315 in accordance with the execution order to be applied that is determined by the applied execution order determination part 350. If notified from the applied execution order determination part 350 that the entry of the second request is added, the rearrangement part 335 adds the entry of the second request to the queue table 315, using the copy of the queue table 315 created by the second latency time prediction part 340. Subsequently, the rearrangement part 335 rearranges the execution order of all the requests within the queue table 315.

The interruption part 355 actually interrupts the process for the active request in response to determination of the second execution order as the execution order to be applied by the applied execution order determination part 350. The data read before interruption may be temporarily stored in the memory, so that it is sufficient to read only the remaining data at the time of restart as mentioned above.

In this way, in the storage manager 300b according to the second embodiment, if the average latency time of the host apparatus 105 can be shortened in view of the overhead, the process for the currently active request is once interrupted, and the request accepted after it is processed ahead. As a result, with the device according to the invention, the average latency time of the host apparatus 105 can be minimized, whereby the efficiency of the recall request is enhanced as seen from the host apparatus.

(Third Embodiment)

Figure 9:
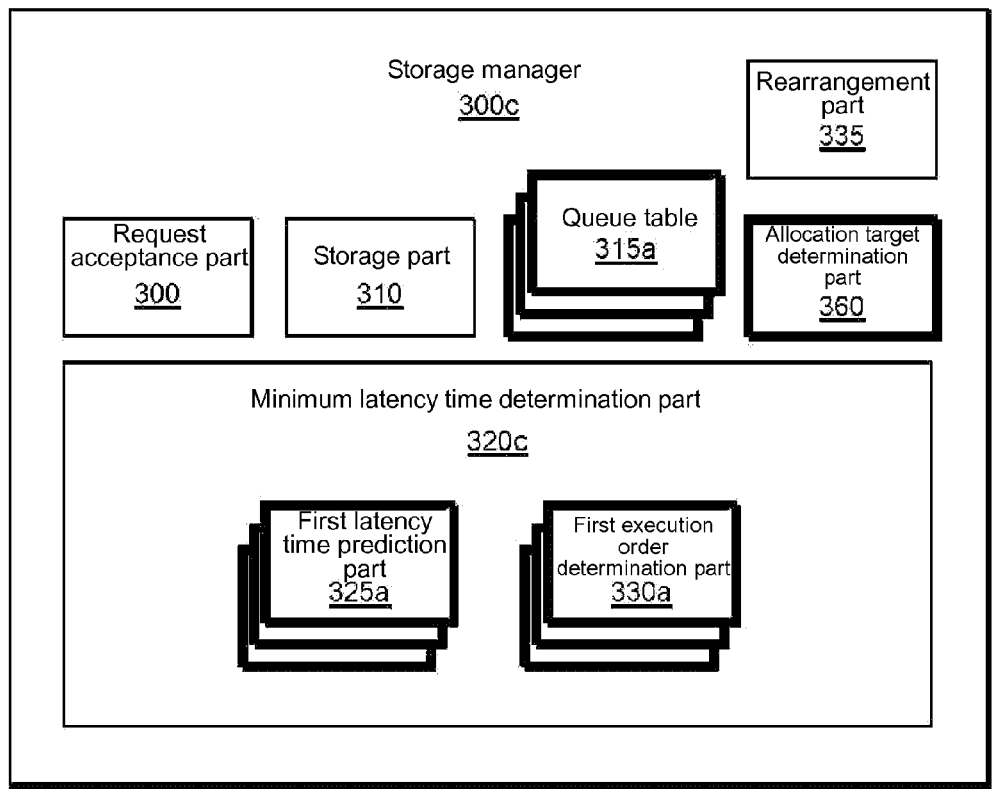
FIG. 9 is a diagram showing the functional configuration of a storage manager as an apparatus for determining the data recall order, according to a third embodiment of the invention.

FIG. 9 is a diagram showing one example of the functional configuration of a storage manager 300c as an apparatus for determining the data recall order according to a third embodiment of the invention. The storage manager 300c according to the third embodiment has basically the same functional configuration as the storage manager 300a according to the first embodiment. However, in the third embodiment, the library system 115 as shown in FIG. 1 comprises a plurality of tape drive devices 135. That is, the storage manager 300c according to the third embodiment is an extension of the storage manager 300a according to the first embodiment to be applicable to the library system 115 comprising the plurality of tape drive devices 135a, 135b, . . . .

The storage manager 300c according to the third embodiment comprises, for each tape drive device 135, the queue table 315, the first latency time prediction part 325, and the first execution order determination part 330. The storage part 310 according to the third embodiment virtually stores one request in the plurality of queue tables 315a, 315b, . . . . Each of the components prepared for each tape drive device 135 functions for the virtually stored request in the same way as described in the first embodiment.

That is, the minimum latency time determination part 320c according to the third embodiment obtains the execution order in which the average latency time from acceptance of the request to completion of the process is minimum among all the execution orders conceivable for all the requests put into the corresponding queue table 315 for each pair of the first latency time prediction part 325 and the first execution order determination part 330 corresponding to the same queue table 315. Since the method for obtaining the minimum execution order has been described above in the first embodiment, the explanation thereof is omitted here to avoid the repetition.

The storage manager 300c according to the third embodiment also comprises an allocation target determination part 360. The allocation target determination part 360 determines the tape drive device 135 to actually allocate the request, based on plural execution orders each obtained by each pair of the first latency time prediction part 325 and the first execution order determination part 330. That is, the allocation target determination part 360 allocates the one request to the tape drive device 135 provided with the first execution order determination part 330 that determines the minimum total of the latency time among the plural totals of the latency time in the plural first execution orders determined by the first execution order determination part 330a, 330b, . . . .

The rearrangement part 335 according to the third embodiment settles the storage of the request in the queue table 315 corresponding to the tape drive device 135 determined as the allocation target by the allocation target determination part 360. And the rearrangement part 335 rearranges the execution order of all the requests within the queue table 315 in which the storage of the request is settled in accordance with the first execution order determined by the first execution order determination part 330 corresponding to the tape drive device 135 determined as the allocation target.

(Fourth Embodiment)

Figure 10:
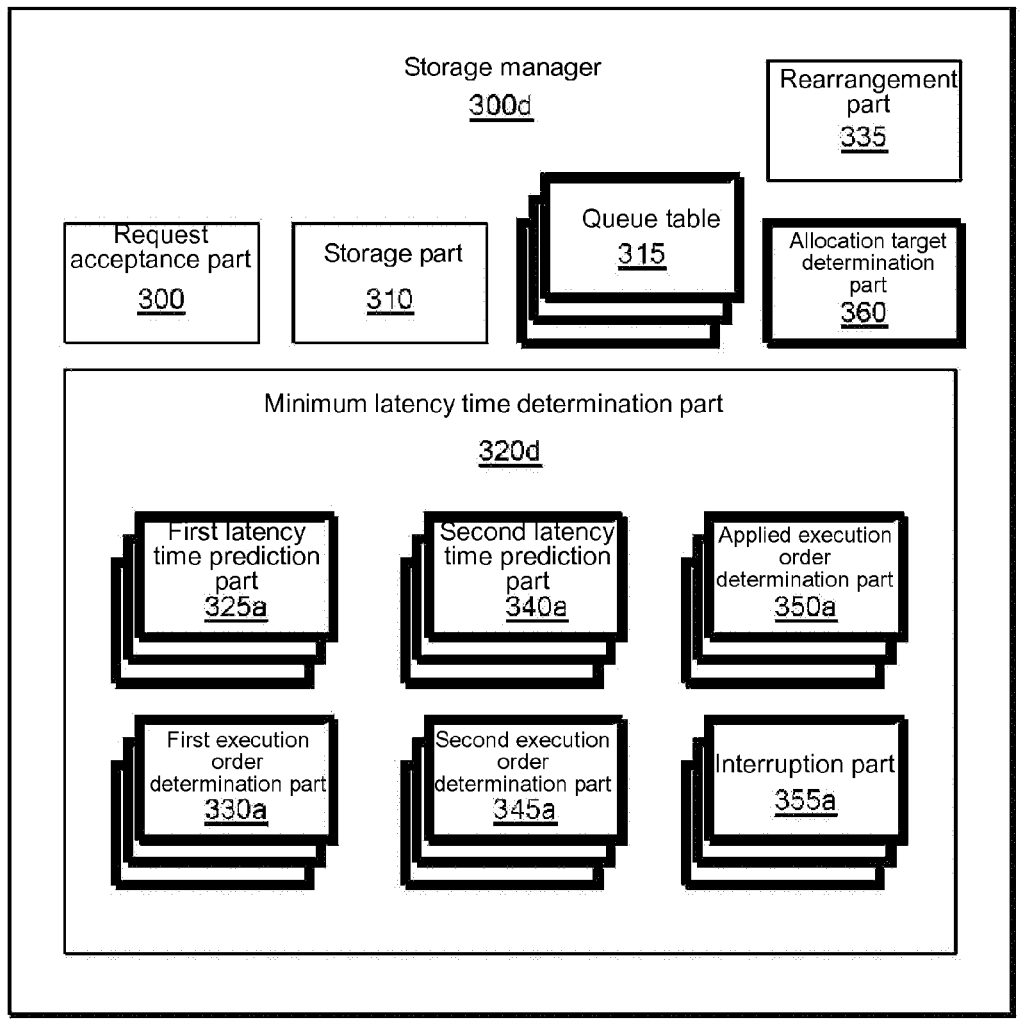
FIG. 10 is a diagram showing the functional configuration of a storage manager as an apparatus for determining the data recall order, according to a fourth embodiment of the invention.

FIG. 10 is a diagram showing one example of the functional configuration of a storage manager 300d as an apparatus for determining the data recall order according to a fourth embodiment of the invention. The storage manager 300d according to the fourth embodiment has basically the same functional configuration as the storage manager 300b according to the second embodiment. However, in the fourth embodiment, the library system 115 as shown in FIG. 1 comprises a plurality of tape drive devices 135. That is, the storage manager 300d according to the fourth embodiment is an extension of the storage manager 300b according to the second embodiment to be applicable to the library system 115 comprising the plurality of tape drive devices 135a, 135b, . . . .

The storage manager 300d according to the fourth embodiment comprises, for each tape drive device 135, the queue table 315, the first latency time prediction part 325, the first execution order determination part 330, the second latency time prediction part 340, the second execution order determination part 345, the applied execution order determination part 350 and the interruption part 355. The storage part 310 according to the fourth embodiment virtually stores one request in the plurality of queue tables 315a, 315b, . . . . Each of the components prepared for each tape drive device 135 functions for the virtually stored request in the same way as described in the first and second embodiments.

That is, in the minimum latency time determination part 320d according to the fourth embodiment, the corresponding applied execution order determination part 350 determines the execution order to be applied by comparing the first execution order and the second execution order determined by the corresponding first execution order determination part 330 and the second execution order determination part 345,
respectively for each queue table 315. Since the method for obtaining the minimum execution order has been described above in the second embodiment, the explanation thereof is omitted here to avoid the repetition.

The storage manager 300c according to the fourth embodiment also comprises the allocation target determination part 360. The allocation target determination part 360 according to the fourth embodiment finally determines the tape drive device 135 to actually allocate the request based on the plural execution orders each obtained by a plurality of the applied execution order determination parts 350a, 350b, . . . . That is, the allocation target determination part 360 according to the fourth embodiment allocates the one request to the tape drive device 135 corresponding to the applied execution order determination part 350 that determines the minimum total of the latency time among the plural totals of the latency time in the plural execution orders to be applied that are determined by the plurality of applied execution order determination parts 350a, 350b, . . . .

The rearrangement part 335 according to the fourth embodiment settles the storage of the request in the queue table 315 corresponding to the tape drive device 135 to which the request is allocated by the allocation target determination part 360. And the rearrangement part 335 rearranges the execution order of all the requests within the queue table 315 in which the storage of the request is settled in accordance with the execution order to be applied that is determined by the applied execution order determination part 350 corresponding to the tape drive device 135 to which the request is allocated.

Figure 11:
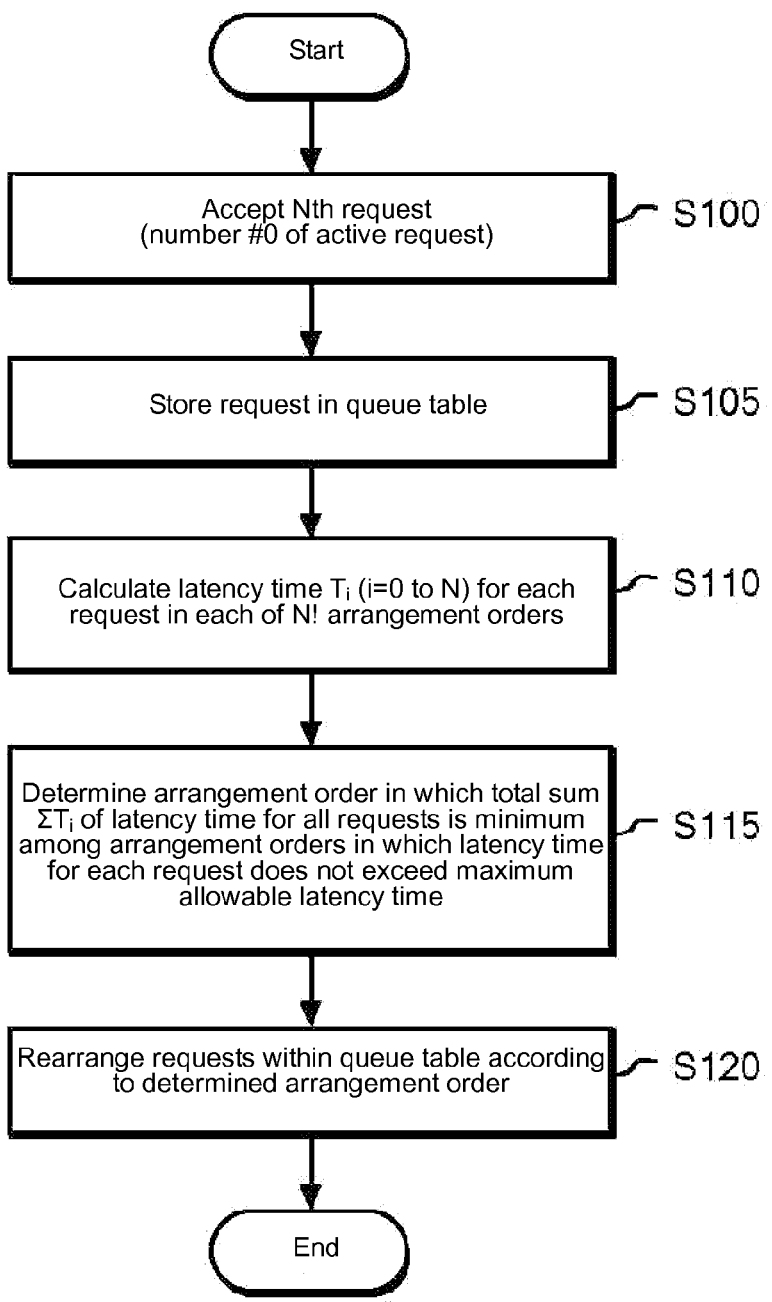
FIG. 11 is a flowchart showing the flow of a process of the storage manager, according to the first embodiment of the invention.

Referring now to a flowchart of FIG. 11, the operation of the storage manager 300a as the apparatus for determining the data recall order according to the first embodiment will be described below. In FIG. 11, the process starts at step 100, where the storage manager 300a accepts the Nth request from the host apparatus 105, and stores the request in the queue table 315 (step 105). It is supposed that the command ID of the active request at this time is command #0, and the N−1 requests from the request (command #1) to request (command #(N−1)) are stored in the queue table 315.

If the request (command #N) is stored in the queue table 315, the storage manager 300a calculates the latency time Ti (i=0 to N) for each request in performing the process in each of all the execution orders conceivable for all the requests stored in the queue table 315, that is, the N! arrangement orders (step 110). Herein, the latency time for each request means the latency time from acceptance of each request in the storage manager 300a to completion of processing in the tape drive device 135.

If the latency time for each request is calculated in each of the N! arrangement orders, the storage manager 300a determines all of such arrangement orders in which the latency time for each request does not exceed the maximum allowable latency time. And the storage manager 300a determines, as the first execution order, the execution order in which the total sum of latency time for all the requests including the active request (command #0) is minimum among the determined arrangement orders (step 115). If there is no arrangement order in which the latency time for all the requests is within the maximum allowable latency time, the process is ended.

Finally, the storage manager 300a rearranges the requests within the queue table 315 in accordance with the first execution order as the execution order to be applied (step 120). And the process is ended.

The operation of the storage manager 300c according to the third embodiment is basically the same as the flowchart shown in FIG. 11. However, in the storage manager 300c according to the third embodiment, the request is stored virtually, not definitely, in the plurality of queue tables 315a, 315b, . . . at step 105. And the storage manager 300c performs the steps 110 and 115 for each queue table 315.

Thereafter, the storage manager 300c according to the third embodiment determines, as the execution order to be applied, the first execution order in which the total of latency time is minimum among the plurality of execution orders each determined for each queue table 315, before going to step 120. And the storage manager 300c allocates the request to the tape drive device 135 corresponding to the queue table 315 for which the first execution order is determined as the execution order to be applied. That is, the storage of the request is settled for only the queue table 315 for which the first execution order is determined as the execution order to be applied. Thereafter, the process goes to step 120, where the storage manager 300c rearranges the requests within the queue table 315 corresponding to the tape drive device 135 to which the request is allocated in accordance with the execution order to be applied.

Figure 12:
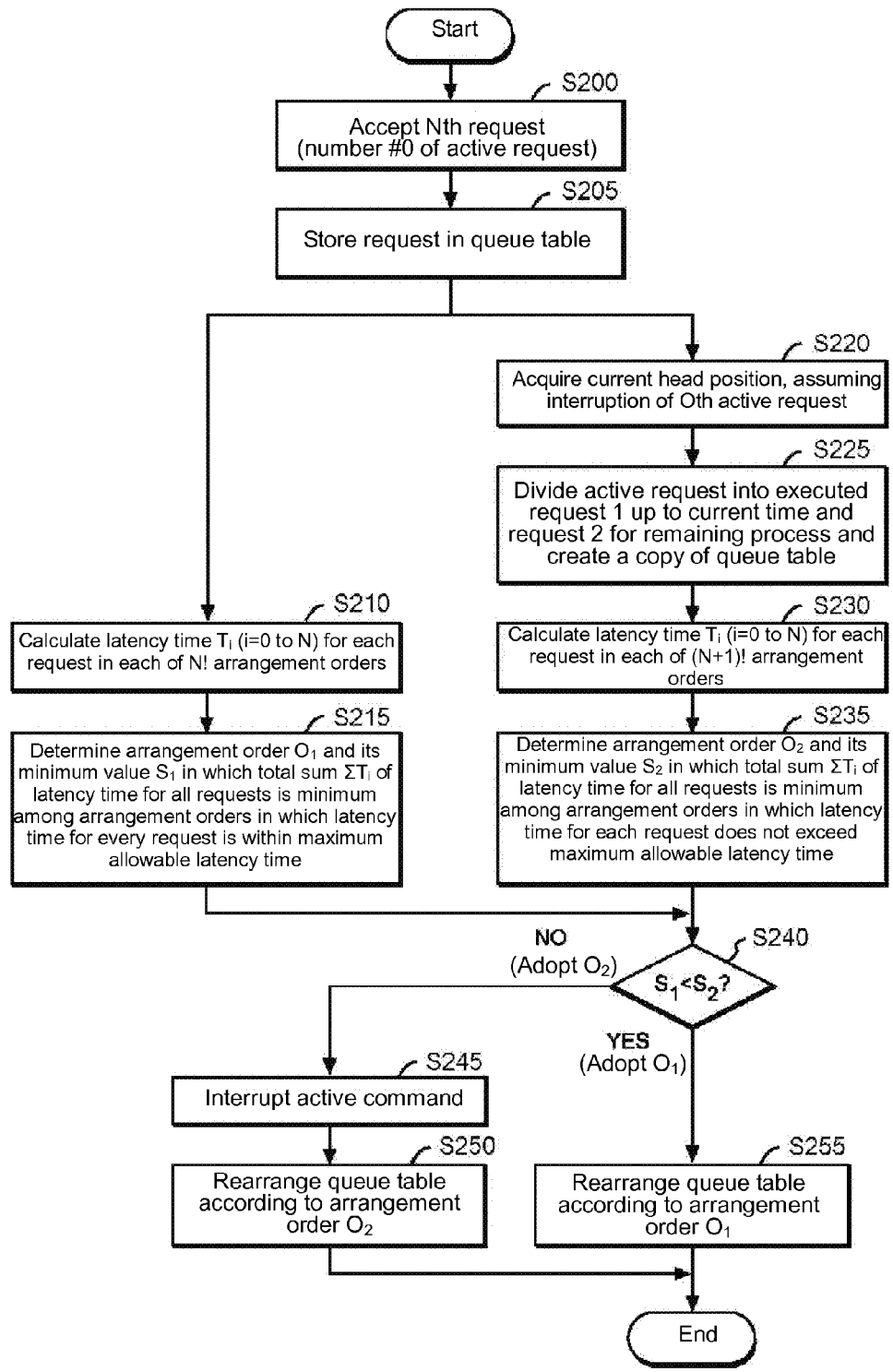
FIG. 12 is a flowchart showing the flow of a process of the storage manager, according to the second embodiment of the invention.

Referring now to a flowchart of FIG. 12, the operation of the storage manager 300b as the apparatus for determining the data recall order according to the second embodiment will be described below. In FIG. 12, the process starts at step 200, where the storage manager 300b accepts the Nth request from the host apparatus 105, and stores the request in the queue table 315 (step 205). It is supposed that the command ID of the active request at this time is command #0, and the N−1 requests from the request (command #1) to request (command #(N−1)) are stored in the queue table 315.

If the request (command #N) is stored in the queue table 315, the storage manager 300b performs a first process from step 210 to step 215 and a second process from step 220 to step 235 in parallel, or in series. The processes at steps 210 and 215 are the same as described at steps 110 and 115 in FIG. 11, and not described in detail. The storage manager 300b according to the second embodiment acquires the first execution order $O_1$ and the minimum total value $S_1$ of the latency time corresponding to the first execution order $O_1$ after the processing at step 215. However, if there is no arrangement order in which the latency time for all the requests is within the maximum allowable latency time at step 215, the process goes to step 245.

The storage manager 300b also acquires the current position of a read head for the tape drive device 135, assuming the interruption of the active request (command #0) (step 220). And the storage manager 300b virtually divides the active request (command #0) into a first request (command #0-1) for performing the process up to current time and a second request (command #0-2) for performing the remaining process, and newly creates a copy of the queue table 315 including the request 2 using the current position of the head (step 225).

And the storage manager 300b calculates the latency time Ti (i=0-1, 0-2, 1-N) for each request in performing the process in each of the (N+1)! arrangement orders, based on the copy of the queue table 315 storing the N+1 requests including the request 2 (step 230). The latency time for each request here means the latency time from acceptance of each request in the storage manager 300b to completion of the process in the tape drive device 135.

If the latency time for each request is calculated in each of the (N+1)! arrangement orders, the storage manager 300b determines the arrangement orders in which the latency time for each request does not exceed the maximum allowable latency time. And the storage manager 300b determines the execution order in which the total sum of latency time for all the requests including the request 1 and request 2 is minimum among the determined arrangement orders as the second execution order $O_2$ and the minimum total value $S_2$ of latency time corresponding to the second execution order $O_2$ (step 235). If there is no arrangement order in which the latency time for all the requests is within the maximum allowable latency time, the process goes to step 255.

Thereafter, the storage manager 300b compares the minimum total value $S_1$ of the latency time corresponding to the first execution order $O_1$ and the minimum total value $S_2$ of the latency time corresponding to the second execution order $O_2$ (step 240). If the total value $S_2$ is less than or equal to $S_1$ (step 240: NO), the storage manager 300b instructs the library system 115 to interrupt the active request (command #0) (step 245). And the storage manager 300b updates the original queue table 315, using the copy of the queue table 315, and rearranges the requests within the queue table 315 after update, including the request 2, in accordance with the second execution order $O_2$ (step 250). And the process is ended.

On the other hand, if the total value $S_2$ is greater than to $S_1$ (step 240: YES), the storage manager 300b rearranges the requests within the queue table 315 in accordance with the first execution order $O_1$ (step 255). And the process is ended.

The operation of the storage manager 300d according to the fourth embodiment is basically the same up to the step 240 as the flowchart shown in FIG. 12. However, in the storage manager 300d according to the fourth embodiment, the request is stored virtually, not definitely, in the plurality of queue tables 315a, 315b, . . . at step 205. And the storage manager 300d performs the process from step 210 to step 240 for each queue table 315 to determine the execution order to be applied. That is, if the answer is YES at step 240, the first execution order $O_1$ is adopted, whereas if the answer is NO at step 240, the second execution order $O_2$ is adopted.

Thereafter, the storage manager 300d according to the fourth embodiment determines, as the execution order to be applied, the execution order in which the total of latency time is minimum among the plurality of execution orders each determined for each queue table 315. And the storage manager 300d allocates the request to the tape drive device 135 corresponding to the queue table 315 for which the execution order to be applied is determined. That is, the storage of the request is settled for only the queue table 315 for which the execution order to be applied is determined. Lastly, the storage manager 300d rearranges the requests within the queue table 315 corresponding to the tape drive device 135 to which the request is allocated in accordance with the execution order to be applied.

Though the present invention has been described above using the embodiments, the technical range of the invention is not limited to the range as described in the embodiments. For example, in the third embodiment of the invention that extends the first embodiment of the invention to be applicable to the library system 115 including the plurality of tape drive devices 135a, 135b, . . . , the average latency time is calculated, assuming the allocation of the newly accepted request to the plurality of queue tables each prepared for each tape drive device 135. However, the following method may be adopted to shorten the computation time.

That is, if the newly accepted request is made for the tape cartridge 145 mounted on any of the tape drive devices 135, the request is allocated to the tape drive device 135 having the tape cartridge 145 mounted. If the newly accepted request is not made for the tape cartridge 145 mounted on any of the tape drive devices 135, the requests for the same tape cartridge 145 are collected and grouped. And the requests are distributed in order from the group having more members to the tape drive devices 135 having less requests stored in the queue table 315. And after the allocation of request is determined, the storage manager 300c according to the first embodiment performs the rearrangement of requests in the queue table 315 for the tape drive device 135 to which the request is allocated.

With the same method, the second embodiment can be extended to be applicable to the library system 115 including the plurality of tape drive devices 135a, 135b, .... In this way, it will be apparent to a person skilled in the art that various changes or modifications may be made to the above embodiments. Accordingly, such changes or modifications may be naturally encompassed in the technical range of the invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electro-magnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. An apparatus for use with a tape library and for determining a data recall order, the apparatus comprising:
   request acceptance means for accepting a request of a host apparatus for data required to recall from said tape library;
   storage means for storing said request in a queue table;
   first latency time prediction means for predicting latency time from acceptance of each request by said request acceptance means to completion of a process in said tape library in performing the process in each of all execution orders conceivable for all the requests stored in said queue table in response to storage of said request in said queue table;
   first execution order determination means for determining a first execution order, as an execution order to be applied, that is an execution order in which a total sum of said latency time predicted by said first latency time prediction means for all the requests including an active request is minimum; and
   rearrangement means for rearranging the execution order of all said requests within said queue table in accordance with said execution order to be applied.

2. The apparatus according to claim 1, wherein said first execution order determination means determines, as the execution order to be applied, the first execution order that is the execution order in which the total sum of said latency time predicted by said first latency time prediction means for all the requests including the active request is minimum and said latency time for each request does not exceed the maximum allowable latency time.

3. The apparatus according to claim 1, wherein said tape library includes a plurality of tape drives, each of which is provided with a queue table, first latency time prediction means and first execution order determination means,
   said storage means virtually stores said one request in each of said plurality of queue tables,
   said apparatus further comprising allocation target determination means for allocating said one request to said tape drive provided with said first execution order determination means that determines the minimum total sum of said latency time among the plurality of total sums of said latency time in said plurality of first execution orders determined by said plurality of first execution order determination means, and
   said rearrangement means settles the storage of said one request in said queue table corresponding to said tape drive to which said request is allocated and rearranges the execution order of all the requests within said queue table in accordance with said first execution order determined by said first execution order determination means corresponding to said tape drive to which said request is allocated.

4. The apparatus according to claim 1, further comprising:
   second latency time prediction means for virtually dividing said active request into a first request for performing the process up to current time and a second request for performing the remaining process in response to storage of said request in said queue table, and predicting said latency time for each request in performing the process in each of all the execution orders conceivable for all the requests stored in said queue table including said second request;
   second execution order determination means for determining, as the second execution order, the execution order in which the total sum of said latency time predicted by said second latency time prediction means for all the requests including said first request is minimum;
   applied execution order determination means for re-determining, as said execution order to be applied, said second execution order if the total of said latency time in said second execution order is smaller than the total of said latency time in said first execution order, or otherwise said first execution order; and
   interruption means for interrupting the process for said active request in response to determination of said second execution order as said execution order to be applied.

5. The apparatus according to claim 4, wherein said first execution order determination means determines, as the execution order to be applied, the first execution order that is the execution order in which the total sum of said latency time predicted by said first latency time prediction means for all the requests including the active request is minimum and said latency time for each request does not exceed the maximum allowable latency time, and
   said second execution order determination means for determining, as said second execution order, the execution order in which the total sum of said latency time predicted by said second latency time prediction means for all the requests including said first request is minimum and said latency time for each request does not exceed the maximum allowable latency time.

6. The apparatus according to claim 4, wherein said tape library includes a plurality of tape drives, each of which is provided with a queue table, first latency time prediction means, first execution order determination means, second latency time prediction means, second execution order determination means, interruption means and applied execution order determination means,
   said storage means virtually stores said one request in each of said plurality of queue tables,
   said apparatus further comprising allocation target determination means for allocating said one request to said tape drive provided with said applied execution order determination means that determines the minimum total sum of said latency time among the plurality of total sums of said latency time in said plurality of execution orders to be applied determined by said plurality of applied execution order determination means,
   each of said plurality of interruption means interrupts the process for said active request in response to determination of said corresponding second execution order as said execution order to be applied if said one request is allocated to said corresponding tape drive, and
   said rearrangement means settles the storage of said one request in said queue table corresponding to said tape drive to which said request is allocated and rearranges the execution order of all the requests within said queue table in accordance with said execution order to be applied determined by said applied execution order determination means corresponding to said tape drive to which said request is allocated.

7. A method for determining a data recall order for use with an apparatus connected to a tape library, said method comprising:
   accepting a request from a host apparatus for data required to recall from said tape library;
   storing said request in a queue table;
   predicting latency time for each request from acceptance of said request to completion of a process in said tape library in performing the process in each of all execution orders conceivable for all the requests stored in said queue table in response to storage of said request in said queue table;

determining a first execution order, as an execution order to be applied, that is an execution order in which a total sum of said predicted latency time for all the requests including the active request is minimum; and rearranging the execution order of all said requests within said queue table in accordance with said determined execution order to be applied.

8. The method according to claim 7, further comprising:

dividing said active request into a first request for performing the process up to current time and a second request for performing the remaining process in response to storage of said request in said queue table, and predicting said latency time for each request in performing the process in each of all the execution orders conceivable for all the requests stored in said queue table including said second request;

determining, as the second execution order, the execution order in which the total sum of said predicted latency time for all the requests including said first request is minimum;

re-determining, as said execution order to be applied, said second execution order if the total of said latency time in said second execution order is smaller than the total of said latency time in said first execution order, or otherwise said first execution order; and interrupting the process for said active request in response to determination of said second execution order as said execution order to be applied.

9. The method according to claim 7, wherein said latency time for each request does not exceed the maximum allowable latency time.

10. The method according to claim 7, wherein said tape library includes a plurality of tape drives, each of which is provided with a queue table, and the method further comprises virtually storing said one request in each of said plurality of queue tables, allocating said one request to said tape drive provided with said first execution order determination means that determines the minimum total sum of said latency time among the plurality of total sums of said latency time in said plurality of first execution orders determined by said plurality of first execution order determination means, and settling the storage of said one request in said queue table corresponding to said tape drive to which said request is allocated and rearranging the execution order of all the requests within said queue table in accordance with said first execution order determined by said first execution order determination means corresponding to said tape drive to which said request is allocated.

11. The method according to claim 7, further comprising:

virtually dividing said active request into a first request for performing the process up to current time and a second request for performing the remaining process in response to storage of said request in said queue table, and predicting said latency time for each request in performing the process in each of all the execution orders conceivable for all the requests stored in said queue table including said second request;

determining, as the second execution order, the execution order in which the total sum of said latency time predicted for all the requests including said first request is minimum;

re-determining, as said execution order to be applied, said second execution order if the total of said latency time in said second execution order is smaller than the total of said latency time in said first execution order, or otherwise said first execution order; and interrupting the process for said active request in response to determination of said second execution order as said execution order to be applied.

12. A program product on a physical computer-readable storage medium for determining the data recall order, which is run on an apparatus connected to a tape library, said program product comprising:

computer code for accepting a request of a host apparatus for data required to recall from said tape library;

computer code for storing said request in a queue table;

computer code for predicting latency time for each request from acceptance of said request to completion of a process in said tape library in performing the process in each of all the execution orders conceivable for all the requests stored in said queue table in response to storage of said request in said queue table;

computer code for determining a first execution order that is the execution order in which the total sum of said predicted latency time for all the requests including the active request is minimum as the execution order to be applied; and computer code for rearranging the execution order of all said requests within said queue table in accordance with said determined execution order to be applied.

13. The program product according to claim 12, further comprising:

computer code for virtually dividing said active request into a first request for performing the process up to current time and a second request for performing the remaining process in response to storage of said request in said queue table, and computer code for predicting said latency time for each request in performing the process in each of all the execution orders conceivable for all the requests stored in said queue table including said second request;

computer code for determining, as the second execution order, the execution order in which the total sum of said predicted latency time for all the requests including said first request is minimum;

computer code for re-determining, as said execution order to be applied, said second execution order if the total of said latency time in said second execution order is smaller than the total of said latency time in said first execution order, or otherwise said first execution order; and computer code for interrupting the process for said active request in response to determination of said second execution order as said execution order to be applied.

14. The program product according to claim 12, wherein:

said latency time for each request does not exceed a maximum allowable latency time.

15. The program product according to claim 12, wherein said tape library includes a plurality of tape drives, each of which is provided with a queue table, computer code for predicting latency time and computer code for determining the first execution order, and the program product further comprises:

computer code for virtually storing said one request in each of said plurality of queue tables, computer code for allocating said one request to said tape drive provided with computer code for determining said execution order that determines the minimum total sum of said latency time among a plurality of total sums of said latency time in said plurality of first execution orders, and computer code for settling a storage of said one request in said queue table corresponding to said tape drive to which said request is allocated and for rearranging the execution order of all the requests within said queue table in accordance with said first execution order determined by said computer code for determining said first execution order corresponding to said tape drive to which said request is allocated.

16. The program product according to claim 14, wherein said computer code for determining said first execution order determines, as the execution order to be applied, the first execution order that is the execution order in which the total sum of said latency time predicted by said computer code for predicting latency time for all the requests including the active request is minimum and said latency time for each request does not exceed the maximum allowable latency time, and said computer code for determining, as said second execution order, determines the execution order in which the total sum of said latency time predicted by said computer code for predicting latency time for all the requests including said first request is minimum and said latency time for each request does not exceed the maximum allowable latency time.

* * * * *